United States Patent
Kim

(10) Patent No.: US 7,738,669 B2
(45) Date of Patent: Jun. 15, 2010

(54) METHOD OF OUTPUTTING AUDIO SIGNAL FOR THE HARD-OF-HEARING AND MOBILE COMMUNICATION TERMINAL USING THE METHOD

(75) Inventor: Han-il Kim, Seoul (KR)

(73) Assignee: Pantech&Curitel Communications, Inc., Seoul (KR)

( * ) Notice: Subject to any disclaimer, the term of this patent is extended or adjusted under 35 U.S.C. 154(b) by 1268 days.

(21) Appl. No.: 11/258,487

(22) Filed: Oct. 25, 2005

(65) Prior Publication Data

US 2006/0188117 A1  Aug. 24, 2006

(30) Foreign Application Priority Data

Feb. 21, 2005  (KR) .................. 10-2005-0014218

(51) Int. Cl.
*H04R 25/00* (2006.01)
(52) U.S. Cl. .................. 381/333; 381/111; 455/564
(58) Field of Classification Search .................. 381/322, 381/182, 191, 396, 400, 412, 89, 333, 111; 379/430; 445/564
See application file for complete search history.

(56) References Cited

U.S. PATENT DOCUMENTS 5,794,163 A * 8/1998 Paterson et al. ............ 379/430
6,865,403 B1 * 3/2005 Averkamp .................. 455/564
7,106,878 B2 * 9/2006 Saiki et al. ................. 381/396
2005/0271226 A1 * 12/2005 Tanabu et al. .............. 381/182

FOREIGN PATENT DOCUMENTS

| CN | 1535034 A | 10/2004 |
|---|---|---|
| EP | 0543224 B1 | 4/1992 |

OTHER PUBLICATIONS

Chinese Office Action dated Mar. 13, 2009.

* cited by examiner

*Primary Examiner*—Suhan Ni
(74) *Attorney, Agent, or Firm*—H.C. Park & Associates, PLC

(57) ABSTRACT

A mobile communication terminal includes a receiver converting an audio signal outputted from the mobile communication terminal into an audible sound; a coupler dividing the audio signal outputted from the receiver into first and second audio signals which are different in phase from each other; an audio signal amplifier amplifying the second audio signal outputted from the coupler according to a predetermined amplification gain; a receiver port to which the receiver is detachably connected and which includes a first output port transmitting the first audio signal outputted from the coupler to the receiver and a second output port transmitting the second audio signal amplified by the audio signal amplifier to the receiver; and a controller controlling the mobile communication terminal and the amplification gain of the audio signal amplifier.

5 Claims, 4 Drawing Sheets

METHOD OF OUTPUTTING AUDIO SIGNAL FOR THE HARD-OF-HEARING AND MOBILE COMMUNICATION TERMINAL USING THE METHOD

BACKGROUND OF THE INVENTION

This application claims the priority of Korean Patent Application No. 2005-14218, filed on Feb. 21, 2005, in the Korean Intellectual Property Office, the disclosure of which is incorporated herein in its entirety by reference.

1. Field of the Invention

The present invention relates to a mobile communication terminal and, more particularly, to a mobile communication terminal equipped with hearing aid function for the hard-of-hearing.

2. Description of Related Art

A mobile communication terminal equipped with hearing aid function for the hard-of-hearing has been increasingly demanded. According to FCC (Federal Communications Commission) regulation in the United States, mobile communication terminals equipped with no hearing aid function are not permitted to be sold since the year 2001 in the United States.

A hearing-aid is a device used to help the hard-of-hearing hear sounds better. It includes a telecoil (T-coil) which is a coil of wire that is switched in place of a hearing-aid microphone to allow the hearing-aid to pickup the varying magnetic field at an earpiece of a telephone handset. The T-coil is essentially one half of a transformer, the other half being provided by the handset or an induction loop in a listening assistance system.

FIG. 1 is a schematic diagram of a receiver of a typical mobile communication terminal. A receiver 10 includes a permanent magnet 11 generating a magnetic field, a pole piece 12 forming a magnetic circuit together with the permanent magnet 11, a voice coil 13 wound around the permanent magnet 11 and the pole piece 12, a vibrating plate 14 provided over the pole piece 12, a frame 15 and a cover 16 which cover the permanent magnet 11, the pole piece 12, the voice coil 13, and the vibrating plate 14. The receiver 10 is connected to a receiver port of the mobile communication terminal to output an audio signal from the mobile communication terminal.

FIG. 2 is a schematic diagram of a conventional receiver with hearing aid function. The receiver 10 includes a hearing aid coil (T-coil) 18 inside the cover 16. As shown in FIG. 2, a plurality of layers of the hearing aid coil 18 is provided over the voice coil 13 so that hearing capability can be improved due to a leakage magnetic field.

In more detail, a part of the magnetic field generated by the voice coil 13 leaks out of the receiver. The magnetic field generated by the voice coil 13 causes an induced electromotive force to be generated on the hearing aid coil 18. The electromotive force has the same frequency as but different magnitude from an audio signal inputted to the receiver 10.

Accordingly, since both an acoustic signal outputted from the voice coil 13 and an acoustic signal caused by the electromotive force induced on the hearing aid coil 18 are outputted from a receiver with hearing aid function, the hard-of-hearing can hear sounds better through the receiver with hearing aid function than through a typical receiver.

The receiver with hearing aid function should have an increased impedance to allow the hard-of-hearing to hear sounds better. To increase the impedance, the coil has to be thicker, the number of turns of the coil has to be increased, and the receiver has to be thicker to meet the optimum resonance condition.

However, there is a problem in that such a large-sized receiver is not convenient to use. Further, it is not easy to apply a hearing aid function to an ear mike phone with the receiver that allows a user to hear and input sounds.

SUMMARY OF THE INVENTION

The present invention provides a method of outputting an audio signal in a mobile communication terminal to provide a hearing aid function to the hard-of-hearing, and a mobile communication terminal making use of the method.

According to an aspect of the present invention, there is provided a mobile communication terminal including: a receiver converting an audio signal outputted from the mobile communication terminal into an audible sound; a coupler dividing the audio signal outputted from the receiver into first and second audio signals which are different in phase from each other; an audio signal amplifier amplifying the second audio signal outputted from the coupler according to a predetermined amplification gain; a receiver port to which the receiver is detachably connected and which includes a first output port transmitting the first audio signal outputted from the coupler to the receiver and a second output port transmitting the second audio signal amplified by the audio signal amplifier to the receiver; and a controller controlling the mobile communication terminal and the amplification gain of the audio signal amplifier.

The receiver may include: a permanent magnet generating a magnetic field; a pole piece forming a magnetic circuit together with the permanent magnet; a voice coil which is wound around the permanent magnet and the pole piece and generates a magnetic field according to a first audio signal applied from the first output port; a hearing aid coil which is wound to form a plurality of layers around the voice coil and generates a magnetic field according to a second audio signal applied from the second output port; and a vibrating plate provided over the pole piece.

The controller may calculate an audio signal amplification gain corresponding to an input volume level, and the audio signal amplifier may amplify the second audio signal outputted from the coupler according to the amplification gain transmitted from the controller.

The controller may control the operation of the audio signal amplifier via a serial bus.

According to another aspect of the present invention, there is provided a method of outputting an audio signal in a mobile communication terminal having a receiver port to which a receiver is detachably connected, the method including the operations of: dividing a voice signal extracted from a wireless signal or an audio signal stored and played back in the mobile communication terminal into first and second audio signals; and outputting a control signal so that a coupled audio signal outputted to a T-coil is amplified to have an amplification gain corresponding to an input volume level.

The control signal may be output via a serial bus.

The serial bus may be an I²C bus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 3:
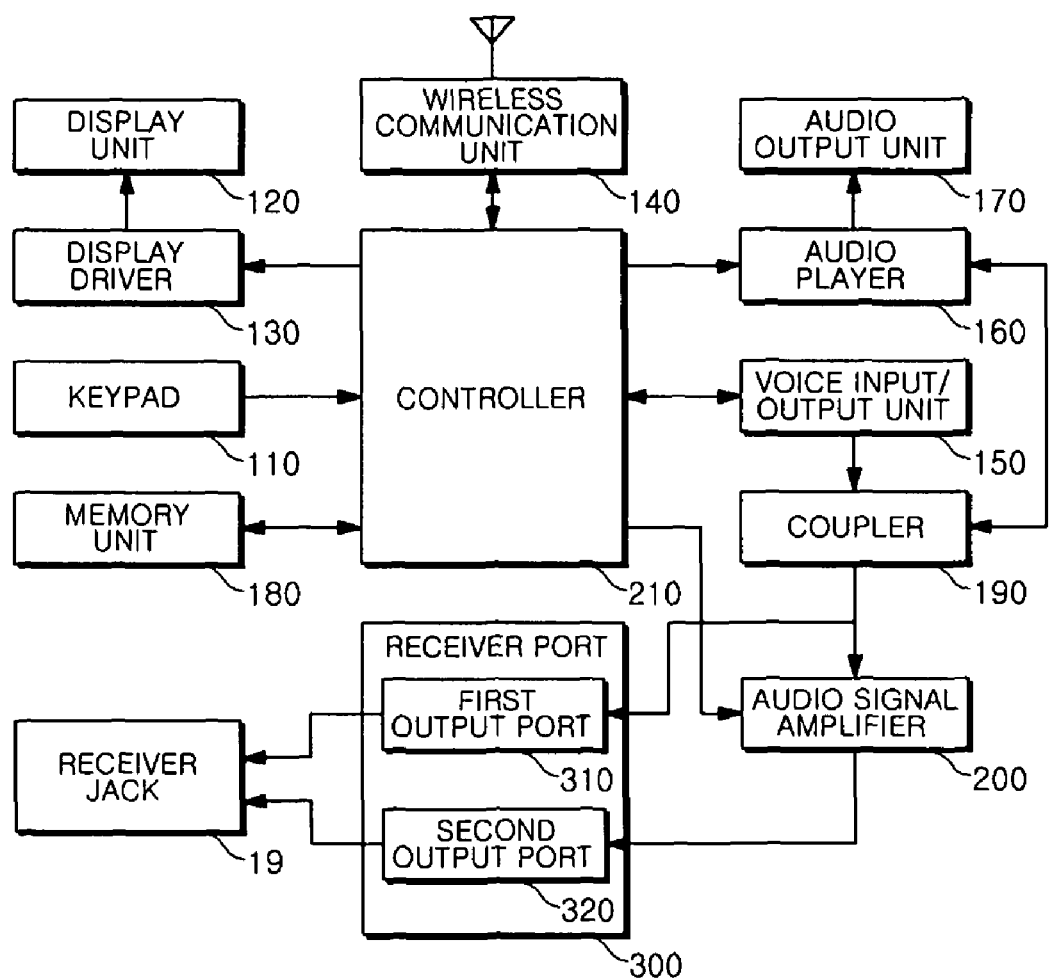
FIG. 3 is a block diagram of a mobile communication terminal in accordance with an embodiment of the present invention.
Figure 4:
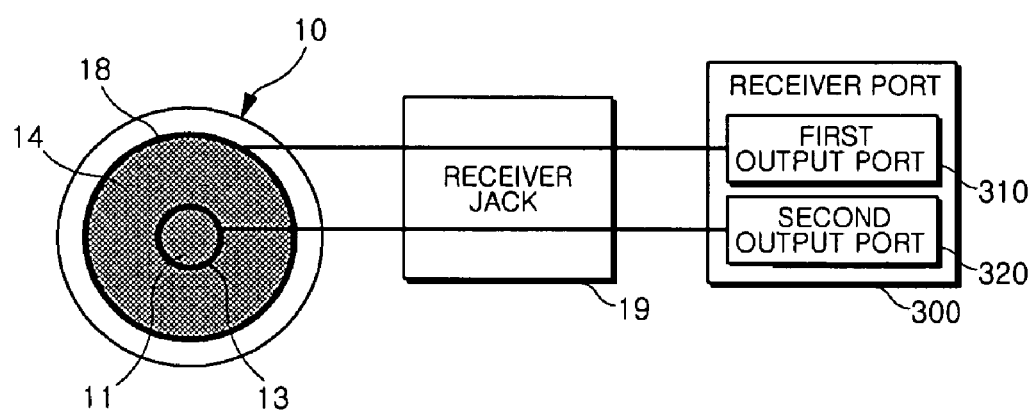
FIG. 4 is a schematic diagram of a receiver in accordance with an embodiment of the present invention.

FIG. 3 is a block diagram of a mobile communication terminal in accordance with an embodiment of the present invention. FIG. 4 is a schematic diagram of a receiver in accordance with an embodiment of the present invention. The mobile communication terminal includes a receiver 10, a coupler 190, an audio signal amplifier 200, a controller 210, and a receiver port 300.

The receiver 10 includes a permanent magnet 11 generating a magnetic field, a pole piece 12 forming a magnetic circuit together with the permanent magnet 11, a voice coil 13 wound around the permanent magnet 11 and the pole piece 12, a hearing aid coil 18 wound to form a plurality of layers around the voice coil 13, and a vibrating plate 14 provided over the pole piece 12. The coupler 190 divides a received audio signal into a first audio signal and a second audio signal, which are different in phase from each other. The audio signal amplifier 200 amplifies the second audio signal outputted from the coupler 190 to have a predetermined amplification gain. The controller 210 controls the mobile communication terminal and also controls the amplification gain of the audio signal amplifier 200. The receiver port 300 includes a first output port 310 transmitting the first audio signal outputted from the coupler 190 to the voice coil 13, and a second output port 320 transmitting the second audio signal amplified by the audio signal amplifier 200 to the hearing aid coil 18. The receiver 10 is detachably connected to the receiver port 300.

The mobile communication terminal typically includes a keypad 110, a display unit 120, a display driver 130, a wireless communication unit 140, a voice input/output unit 150, an audio player 160, an audio output unit 170, and a memory unit 180.

The keypad 110 includes operation keys such as numeric keys, alphabetic keys, and function keys. The display unit 120 is typically a liquid crystal display (LCD) device which allows a user to monitor the operation of a mobile communication terminal. The display driver 130 outputs graphic data and display data including a backlight control signal to the display unit 120. The wireless communication unit 140 includes an antenna and a radio frequency (RF) module. The wireless communication unit 140 is construed to be available in existing communication standards, such as CDMA, GSM, or W-CDMA, and future communication standards to appear in the future. The voice input/output unit 150 converts a digital voice signal into an analog voice signal and vice versa, and typically includes an audio amplifier amplifying the digital voice signal according to a control signal of the controller 210.

A baseband circuit of the wireless communication unit 140 and most circuits of the controller 210 are integrated into a commercially available integrated circuit (IC) chip. The IC chip, which is usually called a Mobile Station Modem (MSM) chipset, includes a hardware dedicated to communication process, a digital signal processor, and a general-purpose microprocessor. The IC chip processes voice and data communications, and controls the entire system according to signals entered through the keypad 110.

The audio player 160 includes a sound chip such as a YAMAHA chip for playing bell sounds or a digital signal processor (DSP) chip for playing MP3 files. The audio output unit 170 amplifies bell sounds or music files played back by the audio player 160 according to a control signal outputted from the controller 210.

The memory unit 180 includes a RAM area for temporarily storing data, a ROM area for storing a drive program which controls the operation of a mobile communication terminal, and a data area for storing user interface (UI) or user application, and data generated by the user application.

According to an embodiment of the present invention, the mobile communication terminal includes a coupler 190 dividing an audio signal into two audio signals which are different in phase from each other, an audio signal amplifier 200 amplifying the audio signal outputted from the coupler 190 to have a predetermined amplification gain and outputting it to the hearing aid coil 18, and a controller 210 controlling the mobile communication terminal and the amplification gain of the audio signal amplifier 200.

For example, like a hybrid coupler, the coupler 190 divides an audio signal, which is outputted from the voice input/output unit 150 or the audio player 160, into two audio signals which have the same magnitude but are different in phase from each other by 90 degrees. One of the two divided audio signals is output to the voice coil 13 of the receiver 10, and the other is output to the audio signal amplifier 200.

The audio signal amplifier 200 includes, for example, an amplifying component such as an operational amplifier (OP-amp). The audio signal amplifier 200 amplifies an audio signal outputted from the coupler 190 and outputs the amplified audio signal to the hearing aid coil 18.

The mobile communication terminal includes a receiver 10 which is connected to the receiver port 300 and outputs an audio signal outputted from the mobile communication terminal. The receiver 10 is an audio signal output unit which is also called an earpiece and is mainly used in compact acoustic equipment.

The receiver port 300 is incorporated in a typical mobile communication terminal. The receiver jack 19 is inserted into the receiver port 300. The receiver port 300 outputs a voice signal outputted from the voice input/output unit 150 or an audio signal outputted from the audio player 160 to the receiver 10. If the receiver 10 connected to the receiver port 300 is an ear microphone, the receiver port 300 outputs an audio signal inputted through the ear microphone to the voice input/output unit 150.

The receiver port 300 includes a voice input port receiving voice from the ear microphone, a ground port, a first output port 310 outputting a first audio signal outputted from the coupler 190 to the voice coil 13 of the receiver 10, and a second output port 320 outputting a second audio signal outputted from the audio signal amplifier 200 to the hearing aid coil 18 of the receiver 10.

The first output port 310 is connected to one end of the receiver jack 19 connected to the voice coil 13 of the receiver 10. The second output port 320 is connected to the other end of the receiver jack 19 connected to the hearing aid coil 18 of the receiver 10.

The receiver 10 is connected to the ear microphone of the mobile communication terminal and converts an audio signal outputted from the voice input/output unit 150 or the audio player 160 into an audible sound. The receiver 10 includes a receiver jack 19, which is detachably connected to the receiver port 300 to receive an audio signal, a permanent magnet 11 generating a magnetic field, a pole piece forming a magnetic circuit together with the permanent magnet 11, a voice coil 13 wound around the permanent magnet 11 and the pole piece 12, a hearing aid coil 18 wound to form a plurality of layers around the voice coil 13, and a vibrating plate 14 provided over the pole piece 12.

The receiver jack 19 is made up of a plurality of electrodes, and is connected to the receiver port 300 to receive an audio signal outputted from the voice input/output unit 150 or the audio player 160. In the receiver 10, the permanent magnet 11 generates a static magnetic field. Subsequently, when an audio signal is input from a mobile communication terminal, current flowing through the voice coil causes a dynamic magnetic field to be created, thereby generating a Lorentz force. At this time, since the audio signal is an alternating current, the polarity is changed in a very short period (approximately $\frac{1}{1000}$ sec). Due to the change in the polarity, the direction of Lorentz force is also changed.

The magnitude of Lorentz force is proportional to the magnitude of flux density, the amount of current, and the length of the voice coil 13. The direction of Lorentz force is a direction perpendicular to a plane formed by the flux density and the current. Accordingly, the vibrating plate 14 moves up and down due to the Lorentz force, thereby producing a sound.

The second audio signal, which passes through the coupler 190, the audio signal amplifier 200, and the second output port 320 of the receiver port 300, flows through the hearing aid coil 18, thereby generating an induced electromotive force. The electromotive force has the same frequency as but different magnitude from the first audio signal inputted to the receiver 10. An acoustic signal outputted from the receiver 10 with hearing aid function is obtained by adding both an acoustic signal by the voice coil 13 and an acoustic signal by the induced electromotive force of the hearing aid coil 18. Accordingly, the hard-of-hearing can hear sounds better through the receiver 10 with hearing aid function than through a conventional receiver.

The controller 210 controls the mobile communication terminal and also controls an amplification gain of the audio signal amplifier 200. The controller 210 calculates an amplification gain of the second audio signal according to a volume level adjusted by a user and transmits it to the audio signal amplifier 200. Accordingly, the controller 210 supports UI through the display unit 120.

A user sets a volume level through UI provided by the controller 210, for example, by pressing a key of the keypad 110. The controller 210 calculates an amplification gain of the second audio signal according to a volume level adjusted by the user, and transmits the calculated amplification gain to the audio signal amplifier 200.

According to an embodiment of the present invention, the controller 210 controls the operation of the audio signal amplifier 200 using a serial bus. In one embodiment, the serial bus is an I²C bus. The I²C bus, also called an Inter-IC, is a bi-directional two-wire serial bus that provides a communication link between integrated circuits. Phillips introduced the I²C bus 20 years ago for mass-produced items such as televisions, VCRs, and audio equipment.

The controller 210 calculates the amplification gain of the audio signal amplifier 200 corresponding to a volume level adjusted by a user, and transmits the calculated amplification gain to the audio signal amplifier 200 via the I²C bus. The audio signal amplifier 200 amplifies the second audio signal outputted from the coupler 190 based on the amplification gain outputted from the controller 210, and outputs the amplified audio signal to the hearing aid coil 18.

Figure 5:
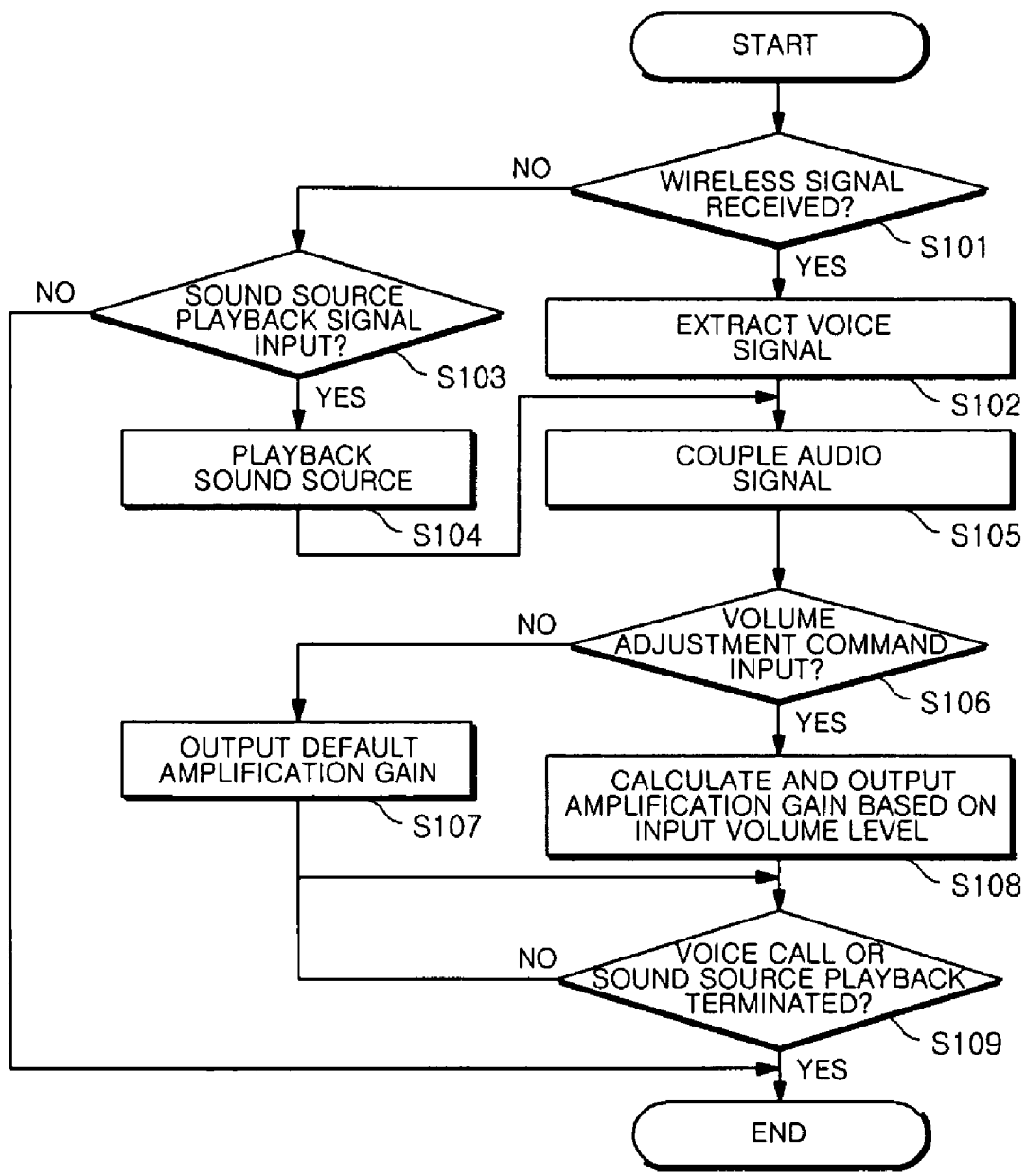
FIG. 5 is a flow chart of a method of outputting an audio signal in a mobile communication terminal in accordance with an embodiment of the present invention.

FIG. 5 is a flow chart of a method of outputting an audio signal in a mobile communication terminal according to an embodiment of the present invention.

As shown in FIG. 5, the wireless communication unit 140 extracts a voice signal from a wireless signal received via an antenna and outputs it to the coupler 190 (operations S101 and S102). When a sound source playback signal is input from a user, the audio player 160 outputs an audio signal played back from the sound source stored in the mobile communication terminal to the coupler 190 (operations S103 and S104).

An example of the coupler 190 is a hybrid coupler outputting signals which have the same magnitude but are different in phase from each other by 90 degrees. In operation S105, the coupler 190 couples an audio signal inputted from the voice input/output unit 150 or the audio player 160 into first and second audio signals which have the same magnitude but are different in phase from each other, in which the first audio signal is output to the voice coil 13 of the receiver 10 through the first output port 310 of the receiver port 300, and the second audio signal is output to the audio signal amplifier 200.

The audio signal amplifier 200 amplifies the second audio signal outputted from the coupler 190 based on a predetermined amplification gain. The controller 210 checks if a volume level is input from a user (operation S106). If the volume level is not input, a predetermined default amplification gain is output to the audio signal amplifier (operation S107).

If the volume level is input from the user, an amplification gain of the second audio signal corresponding to the volume level is calculated and transmitted to the audio signal amplifier 200 (operation S108). Accordingly, the controller 210 supports UI through the display unit 120.

The user sets a volume level through UI provided by the controller 210, for example, by pressing a key of the keypad 110. The controller 210 calculates an amplification gain of the second audio signal based on the magnitude of the volume level inputted by the user, and transmits the calculated amplification gain to the audio signal amplifier 200.

The amplification gain outputted from the controller 210 is transmitted to the audio signal amplifier 200 via a serial bus. In one embodiment, the serial bus is an I²C bus. The controller 210 calculates an amplification gain of the audio signal amplifier 200 corresponding to a volume level inputted by the user, and transmits the amplification gain to the audio signal amplifier 200 via the I²C bus.

Figure 1:
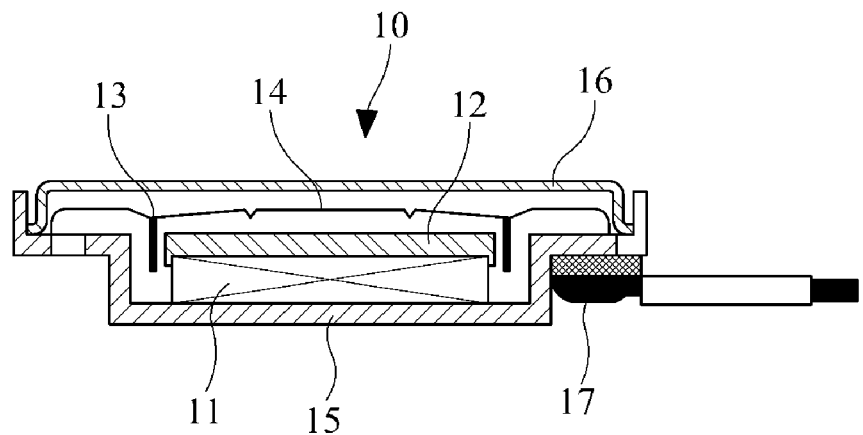
FIG. 1 is a schematic diagram of a receiver of a typical mobile communication terminal.
Figure 2:
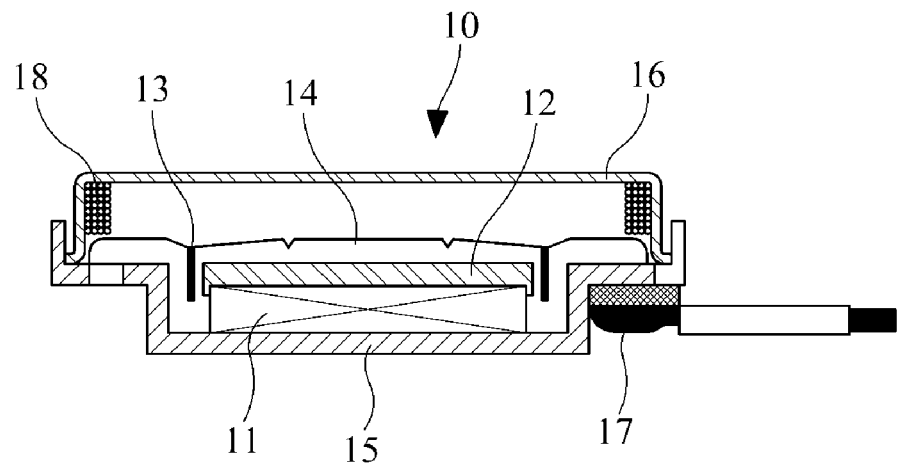
FIG. 2 is a schematic diagram of a conventional receiver with hearing aid function.

The amplification gain outputted from the controller 210 depends on components constituting the audio signal amplifier 200. The audio signal amplifier 200 amplifies the second signal outputted from the coupler 190 based on the amplification gain outputted from the controller 210 and outputs the amplified signal to the hearing aid coil 18 of the receiver 10 through the second output port 320. The operation of the receiver 10 has been already described with reference to FIGS. 1 and 2 and a detailed description thereof will thus be omitted herein. When voice call or sound source playback is terminated, the controller 210 stops operating (operation S109).

As apparent from the above description, according to the method of outputting an audio signal for the hard-of-hearing and the mobile communication terminal making use of the method, since an audio signal path to a voice coil and an audio signal path to a hearing aid coil are separately provided, it is possible to improve an output of the hearing aid coil in addition to maintaining a signal level of an audio signal, without the need to increase the size of a receiver.

In addition, the amplification gain of an audio signal amplifier amplifying an audio signal outputted to a hearing aid coil can be adjusted according to a volume level inputted by a user.

Further, since the controller of the mobile communication terminal can output a control signal to an audio signal amplifier via a serial bus such as I²C, a hardware design is facilitated.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal, comprising:
   a receiver to convert an audio signal outputted from the mobile communication terminal into an audible sound;
   a coupler to divide the audio signal outputted from the receiver into first and second audio signals which are different in phase from each other;
   an audio signal amplifier to amplify the second audio signal outputted from the coupler according to a predetermined amplification gain;
   a receiver port to which the receiver is detachably connected and which includes a first output port to transmit the first audio signal outputted from the coupler to the receiver and a second output port to transmit the second audio signal amplified by the audio signal amplifier to the receiver; and
   a controller to control the mobile communication terminal and the amplification gain of the audio signal amplifier.

2. The mobile communication terminal of claim 1, wherein the receiver includes:
   a permanent magnet to generate a magnetic field;
   a pole piece to form a magnetic circuit together with the permanent magnet;
   a voice coil which is wound around the permanent magnet and the pole piece and generates a magnetic field according to a first audio signal applied from the first output port;
   a hearing aid coil which is wound to form a plurality of layers around the voice coil and generates a magnetic field according to a second audio signal applied from the second output port; and
   a vibrating plate provided over the pole piece.

3. The mobile communication terminal of claim 1, wherein the controller calculates an audio signal amplification gain corresponding to an input volume level, and the audio signal amplifier amplifies the second audio signal outputted from the coupler according to the amplification gain transmitted from the controller.

4. The mobile communication terminal of claim 3, wherein the controller controls the operation of the audio signal amplifier via a serial bus.

5. The mobile communication terminal of claim 4, wherein the serial bus is an I²C bus.

* * * * *